United States Patent [19]

Wilson

[11] Patent Number: 5,568,983
[45] Date of Patent: Oct. 29, 1996

[54] PEEK BEARING WITH TRAPPED PTFE BEARING LINER

[75] Inventor: Robert T. Wilson, Marshalltown, Iowa

[73] Assignee: Fisher Controls International, Inc., Clayton, Mo.

[21] Appl. No.: 262,940

[22] Filed: Jun. 21, 1994

[51] Int. Cl.6 .................................................. F16C 17/02
[52] U.S. Cl. ............................................ 384/295; 384/300
[58] Field of Search .................................... 384/296, 300, 384/297, 295, 909

[56] References Cited

U.S. PATENT DOCUMENTS

| | | | |
|---|---|---|---|
| 2,704,234 | 3/1955 | Love et al. | |
| 2,885,248 | 5/1959 | White | |
| 2,916,338 | 12/1959 | Muschalek, Jr. | |
| 3,033,623 | 5/1962 | Thomson | |
| 3,110,530 | 11/1963 | Herman | |
| 3,421,445 | 1/1969 | Ivanoff | 103/87 |
| 3,782,797 | 1/1974 | Lange et al. | |
| 3,843,216 | 10/1974 | Campbell | |
| 4,308,938 | 1/1982 | Denton | |
| 4,428,689 | 1/1984 | Choate | 384/296 |
| 4,626,112 | 12/1986 | Kramer | 384/300 |
| 4,671,678 | 6/1987 | Munch | 384/125 |
| 4,707,149 | 11/1987 | Hahle | 384/276 |
| 4,809,960 | 3/1989 | Kakimoto | 267/141 |
| 4,916,749 | 4/1990 | Urban et al. | 384/298 |
| 5,143,457 | 9/1992 | Langhof et al. | 384/276 |
| 5,181,784 | 1/1993 | Joerdens | 384/296 |
| 5,192,137 | 3/1993 | Renard | 384/296 |

FOREIGN PATENT DOCUMENTS 42 17 319 A1  2/1993  Germany.

*Primary Examiner*—Lenard A. Footland
*Attorney, Agent, or Firm*—Marshall, O'Toole, Gerstein, Murray & Borun

[57] ABSTRACT

A sleeve bearing for use on rotary valve shafts subjected to substantial operating pressures sufficient to extrude PTFE includes a cylindrical nonmetallic bearing jacket, preferably composed from PEEK. The bearing jacket has a cylindrical inner cavity defined between opposite annular cavity end lips within which cavity is disposed a cylindrical PTFE liner. The annular cavity end lips on the inner surface of the cylindrical nonmetallic bearing jacket extend inwardly to an end lip surface wherein the diameter of said end lip surface is slightly larger than the diameter of the rotary shaft of the control valve. A suitable adhesive is used to bond the liner to the bearing jacket. The cavity end lips maintain the liner in position if the adhesive fails. The end lip construction and the close clearances between the end lips and the rotary shaft enable the PTFE liner to carry greater load than in other PTFE bearing constructions before beginning to extrude PTFE. After the PTFE liner begins to extrude PTFE, the close clearances ensure that any overloaded PTFE is maintained within the cavity of the nonmetallic bearing jacket.

6 Claims, 2 Drawing Sheets

PEEK BEARING WITH TRAPPED PTFE BEARING LINER

The present invention relates to bearings for rotary shafts and in particular to sleeve-type bearings for the rotary shafts of fluid control valves.

BACKGROUND OF THE INVENTION

The use of polytetrafluoroethylene ("PTFE") as a bearing material in sleeve bearings with metallic bearing jackets or other metallic supporting layers has been proposed. For example, in U.S. Pat. No. 3,033,623 entitled "Fluorocarbon Sleeve Bearing" there is disclosed a PTFE bearing with a metal housing that consists of a housing or body that has a bore within which is disposed a readily removable sleeve of substantially uniform thickness over its bearing area. The sleeve, of a laminated construction, is provided with the surface of a wear resistant synthetic plastic having a low coefficient of friction such as PTFE. This wear resistant synthetic plastic forms a thin layer and is firmly anchored to a circumferentially rigid metallic supporting layer or sheet which is sufficiently radially flexible so that the bearing bore diameter and roundness are governed by the diameter and shape of the housing bore. The metallic backing for the wear resistant synthetic plastic having a low coefficient of friction is of such a thickness that it is circumferentially rigid when formed into a cylinder and disposed in the bore of the housing so that assurance is had that neither portion of the laminated liner will wrinkle or bunch in a circumferential direction during operation or be otherwise transformed when enclosed between the shaft and the housing. The metallic backing is sufficiently flexible that it accurately conforms to the surface of the bore and the housing thereby assuring good heat dissipation from the wear resistant synthetic friction surface and also obtaining the accurate dimensioning of the housing bore.

However, in these conventional PTFE bearings when subjected to the substantial operating load pressures common to the rotary shaft sleeve bearing of a fluid control valve, the PTFE bearing surface yields at its cold flow point (approximately 500 psi or 3448 Kpa at system temperatures of 450° F. or 232° C.) and extrudes from between the metal bearing jacket and the valve shaft causing the bearing to fail.

Further, in such prior PTFE bearing construction there is a strong likelihood that during normal operation of the fluid control valve, the metallic backing or housing members of the PTFE bearing will contact the rotary shaft of the fluid control valve causing scoring, seizing or otherwise harming of the shaft. The result will then be reduced valve performance or failure.

It is otherwise known in the art to manufacture sleeve-type bearings for the rotary shafts of fluid control valves entirely from polyetheretherketone ("PEEK"). While such manufacture evades the rotary shaft damage problem when the bearing is subjected to high operating load pressures, such bearings exhibit inferior coefficients of friction and wear resistance characteristics.

Accordingly, it is desired to provide a bearing for the rotary shafts of fluid control valves that is easy to use and has reduced friction, reduced cost, good chemical inertness, improved bearing load capacity and improved operational life characteristics.

SUMMARY OF THE INVENTION

In accordance with the present invention, a bearing for use on a fluid control valve having a rotary shaft subject to operating load pressures sufficient to overload and extrude PTFE is provided. The bearing includes a cylindrical nonmetallic bearing jacket having a cylindrical inner cavity defined between opposite annular cavity end lips within which cavity is disposed a cylindrical liner. The cylindrical nonmetallic bearing jacket is preferably composed of PEEK.

The liner is composed of PTFE, a wear resistant synthetic plastic having a low coefficient of friction. This PTFE liner is further adapted and sized to surround the rotary shaft of a fluid control valve, enabling the shaft to rotate with respect to the liner under operating pressures sufficient to overload and extrude PTFE. The liner is furthermore of a uniform thickness over its entire length such that when nested and thereby maintained in the cylindrical inner cavity of the nonmetallic bearing jacket between the opposite annular cavity end lips, the diameter of the liner conforms to the diameter of the inner surface of the cavity end lips in order to maintain any overloaded PTFE within the cavity. The inner diameter of the PTFE liner and the end lips are substantially the same diameter.

A suitable adhesive bonds the liner to the bearing jacket. The cavity end lips maintain the liner in position if the adhesive fails.

While it is preferred to make the nonmetallic bearing jacket from PEEK, other nonmetallic materials may be employed.

BRIEF DESCRIPTION OF THE DRAWINGS

In the drawings, like reference numerals designate corresponding elements and parts throughout all the figures, in which.

DETAILED DESCRIPTION OF THE INVENTION

Figure 1:
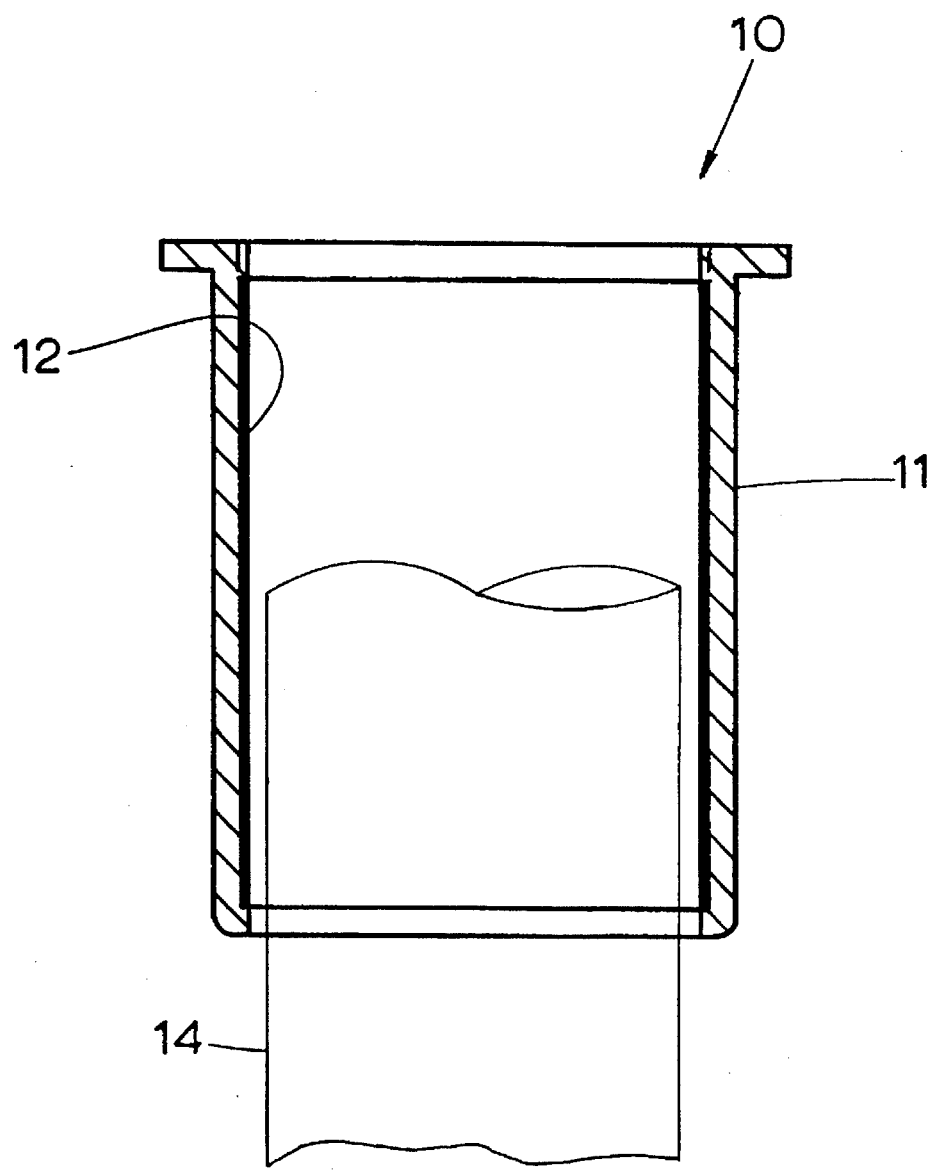
FIG. 1 is a vertical cross-sectional view illustrating a cylindrical nonmetallic bearing with an entrapped PTFE liner installed around the rotary shaft of a fluid control valve in accordance with the present invention.
Figure 2:
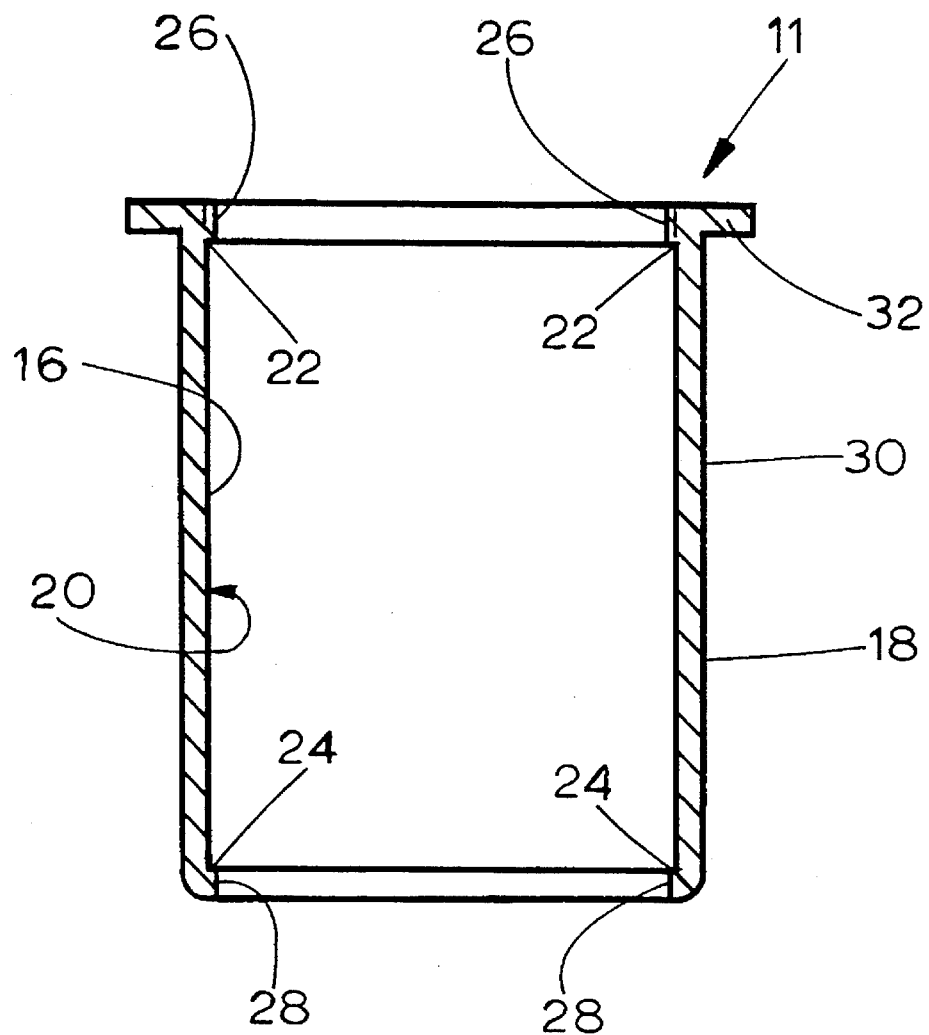
FIG. 2 is a vertical cross-sectional view illustrating the cylindrical bearing jacket of FIG. 1 without the PTFE liner.

Referring now to the drawings, there is shown an embodiment of the bearing 10 of the present invention which includes a nonmetallic bearing jacket 11 and a cylindrical PTFE liner 12 surrounding a fluid control valve rotary shaft 14.

The bearing jacket 11 is cylindrical in shape and is comprised of an inner surface 16 and an outer surface 18. The inner surface 16 of the bearing jacket 11 includes a cylindrical inner cavity 20 which is defined between opposite annular cavity lips 22 and 24 and the fluid control valve rotary shaft 14. In the preferred embodiment the bearing jacket 11 is made entirely from PEEK.

The annular cavity lips 22 and 24 are disposed at the extreme upper and lower ends of the inner surface 16 of the bearing jacket 11. The annular cavity lips 22 and 24 extend inwardly from the interior surface 16 of the bearing jacket 11 to the end lip surfaces 26 and 28. The end lip surfaces 26 and 28 are in close proximity to the fluid control valve rotary shaft 14. Accordingly, the internal diameter of each end lip surface 26 and 28 is just slightly larger than the diameter of the rotary shaft 14. In the preferred embodiment, the clearance or difference between the diameter of each end lip surfaces 26 and 28 and the diameter of the rotary shaft 14 is equal to or less than 0.0075 inch (0.019 cm) thereby providing a zero clearance condition.

The outer surface 18 of the bearing jacket 11 is generally cylindrical in shape. However, on the upper end 30 of the outer surface 18 an abutment 32 extends from the outer surface.

The cylindrical PTFE liner 12 is sized to fit into the cylindrical inner cavity 20 which is defined between opposite annular cavity lips 22 and 24 and the fluid control valve rotary shaft 14. The cylindrical PTFE liner 12 is adapted to surround the fluid control valve rotary shaft 14 to enable the shaft to rotate with respect to the liner during use of the fluid control valve with the cylindrical PTFE liner 12 at operating load pressures sufficient to extrude ie. cold flow, PTFE. A suitable adhesive is used to bond the liner 12 to the bearing jacket 11.

The cylindrical PTFE liner 12 has a thickness sufficient to nest the liner 12 in the cavity 20 between the cavity end lips 22 and 24 with the inner diameter of the liner 12 conforming to the diameter of the end lips surfaces 26 and 28 so that with the rotary control valve shaft 14 under operating pressure normally sufficient to extrude PTFE, the overloaded PTFE is maintained within the confines of the cavity 20, the cavity end lips 22 and 24 of said bearing jacket 11 and the rotary shaft 14 of the fluid control valve. When so confined, it has been determined that the load limit capability for PTFE is substantially increased above its normal extrusion cold flow point.

In operation the fluid control valve rotary shaft 14 comes into contact with the cylindrical PTFE liner 12 and the end lip surfaces 26 and 28 of cavity end lips 22 and 24 over an approximate ninety degree surface of the internal circumference of the bearing. Under normal operation, the nonmetallic or PEEK material composition of the end lip surfaces 26 and 28 of cavity end lips 22 and 24 protect the rotary shaft 14 from being scored. Further, the PTFE liner 12 when entrapped between the cavity end lips 22 and 24 and the rotary shaft 14 will carry a greater load than in other PTFE bearing constructions before beginning to extrude the PTFE liner. After the PTFE liner 12 is overloaded, the maximum clearance of 0.0075 inch (0.0019 cm) i.e. zero clearance between the end lip surfaces 26 and 28 of cavity end lips 22 and 24 and the rotary shaft 14 located at a point directly opposite the high load side between the rotary shaft 14 and the cylindrical PTFE liner 12 is sufficient to ensure that any overloaded PTFE is maintained within the cavity 20.

A bearing of the present invention, for example, may be placed on rotary fluid control valves rated to operate in 600+ psi or 4137+ Kpa systems at 500° F. or 260° C. Under such conditions the bearing will withstand pressures of 5000+ psi or 34475+ Kpa at 450° F. or 232° C. without allowing PTFE extrusion from the cavity 20.

For such an application for a rotary fluid control valve shaft of 0.7500 inches diameter (1.91 cm), the PEEK bearing jacket 11 may be 1.25 inches (3.18 cm) long with an outer diameter between 0.904 and 0.908 inches (between 2.30 and 2.31 cm). The cavity 20 of the inner surface 16 of the bearing jacket 11 may be 1.12 inches (2.84 cm) long with an inner diameter between 0.785 and 0.789 inches (between 1.99 and 2.02 cm). The diameter of the end lip surfaces 26 and 28 may range between 0.752 and 0.756 inches (between 1.91 and 1.92 cm).

The cylindrical PTFE liner 12 for such an application would be fitted to the cavity 20 with a length of 1.12 inches (2.84 cm), a thickness between 0.0145 and 0.0175 (between 0.0368 and 0.0445 cm) and an inner diameter between 0.752 and 0.756 inches (between 1.91 and 1.92 cm) which conforms to the inner diameter of the end lip surfaces, 26 and 28.

The foregoing detailed description has been given for clearness of understanding only, and no unnecessary limitations should be understood therefrom, as modifications will be obvious to those skilled in the art.

I claim:

1. A bearing for use on a fluid control valve having a rotary shaft subject to operating load pressures sufficient to overload and extrude PTFE, said bearing comprising:

a cylindrical PTFE liner adapted to surround the rotary shaft to enable the shaft to rotate with respect to the liner during use of the fluid control valve with the cylindrical PTFE liner bearing the operating load pressures which may be sufficient to extrude PTFE;

a cylindrical non-metallic bearing jacket having an interior surface and including a cylindrical inner cavity defined between opposite annular cavity end lips for retaining said liner, said cavity end lips extending inwardly from the interior surface to an end lip surface wherein the diameter of said end lip surface is slightly larger than the diameter of said rotary shaft and wherein the clearance between said end lip surface and the rotary shaft is zero on the load side of the bearing; and said cylindrical PTFE liner having a thickness sufficient to nest said liner in said cavity between said cavity end lips and with the inner diameter of said liner conforming to the diameter of said end lips surface so that with said rotary control valve under substantial operating pressure sufficient to extrude PTFE, any overloaded PTFE is maintained within said cavity and between said cavity end lips of said bearing jacket.

2. The bearing set forth in claim 1, wherein the cylindrical bearing jacket is formed from a fluorocarbon.

3. The bearing set forth in claim 1, wherein the cylindrical bearing jacket is formed from PEEK.

4. A bearing for use on a fluid control valve having a rotary shaft subject to operating load pressures sufficient to overload and extrude PTFE, said bearing comprising:

a cylindrical PTFE liner adapted to surround the rotary shaft to enable the shaft to rotate with respect to the liner during use of the fluid control valve with the cylindrical PTFE liner bearing the operating load pressures which may be sufficient to extrude PTFE;

a cylindrical non-metallic bearing jacket having an interior surface and including a cylindrical inner cavity defined between opposite annular cavity end lips for retaining said liner, said cavity end lips extending inwardly from the interior surface to an end lip surface wherein the diameter of said end lip surface is slightly larger than the diameter of said rotary shaft and wherein the clearance between said end lip surface and the rotary shaft is less than or equal to 0.0075 inches; and said cylindrical PTFE liner having a thickness sufficient to nest said liner in said cavity between said cavity end lips and with the inner diameter of said liner conforming to the diameter of said end lips surface so that with said rotary control valve under substantial operating pressure sufficient to extrude PTFE, any overloaded PTFE is maintained within said cavity and between said cavity end lips of said bearing jacket.

5. A bearing for use on a movable operating member subject to operating load pressures sufficient to overload and extrude PTFE, said bearing comprising:

a cylindrical PTFE liner adapted to surround the movable operating member to enable the movable operating member to move with respect to the liner with the cylindrical PTFE liner bearing the operating load pressures which may be sufficient to extrude PTFE;

a cylindrical non-metallic bearing jacket having an interior surface and including a cylindrical inner cavity defined between opposite annular cavity end lips for retaining said liner, said cavity end lips extending inwardly from the interior surface to an end lip surface wherein the diameter of said end lip surface is slightly larger than the diameter of said movable operating member and wherein the clearance between said end lip surface and the operating member is zero on the load side of the bearing; and said cylindrical PTFE liner having a thickness sufficient to nest said liner in said cavity between said cavity end lips and with the inner diameter of said liner conforming to the diameter of said end lips surface so that with said movable operating member under substantial operating pressure sufficient to extrude PTFE, any overloaded PTFE is maintained within said cavity and between said cavity end lips of said bearing jacket.

6. A bearing for use on a fluid control valve having an operating member subject to operating load pressures sufficient to overload and extrude PTFE, said bearing comprising:

a cylindrical PTFE liner adapted to surround the operating member to enable the operating member to move with respect to the liner during use of the fluid control valve with the cylindrical PTFE liner bearing the operating load pressures which may be sufficient to extrude PTFE;

a cylindrical non-metallic bearing jacket having an interior surface and including a cylindrical inner cavity defined between opposite annular cavity end lips for retaining said liner, said cavity end lips extending inwardly from the interior surface to an end lip surface wherein the diameter of said end lip surface is slightly larger than the diameter of said operating member and wherein the clearance between said end lip surface and the operating member is zero on the load side of the bearing; and said cylindrical PTFE liner having a thickness sufficient to nest said liner in said cavity between said cavity end lips and with the inner diameter of said liner conforming to the diameter of said end lips surface so that with said fluid control valve under substantial operating pressure sufficient to extrude PTFE, any overloaded PTFE is maintained within said cavity and between said cavity end lips of said bearing jacket.

* * * * *